United States Patent Office 3,541,201
Patented Nov. 17, 1970

3,541,201
NOVEL SODIUM CHLORIDE ENCAPSULATED INJECTIONABLE SUBSTANCES
Ethan Alan Brown, 75 Bay State Road,
Boston, Mass. 02215
No Drawing. Continuation of application Ser. No. 324,861, Nov. 19, 1963, which is a continuation-in-part of application Ser. No. 150,899, Nov. 8, 1961, and also a continuation-in-part of application Ser. No. 580,582, Sept. 20, 1966, which is a continuation-in-part of application Ser. No. 324,861, Nov. 19, 1963. This application Dec. 18, 1968, Ser. No. 784,914
Int. Cl. A61k 9/04, 27/12
U.S. Cl. 424—7
26 Claims

ABSTRACT OF THE DISCLOSURE

Finely divided crystalline lattice micro-particles of a protein, protease, protamine or amino acid as a metabolizable substance with an active fluorescent dye-tagged or untagged drug, bacterial micro-organism, or allergen physically incorporated into the internal structure of the micro-particles, which are encapsulated in sodium chloride as a metabolizable substance, are physically suspended in a physically acceptable oil or aqueous carrier to provide a therapeutic composition for injection.

---

The present application is a continuation of my copending applications Ser. No. 324,861, filed Nov. 19, 1963 now abandoned, which is a continuation-in-part of my application Ser. No. 150,899 filed Nov. 8, 1961, issued as U.S. Patent No. 3,185,625 on May 25, 1965, and Ser. No. 580,582, filed Sept. 20, 1966, now abandoned, which is a continuation-in-part of application Ser. No. 324,861, filed Nov. 19, 1963.

This invention relates to novel injectionable substances and their method of administration. More particularly the invention embraces injectionable compositions comprising a metabolizable carrier having large amounts of an active drug incorporated therein. Preferably, the carrier and drug are encased in a suitable encapsulating material as micro-particles and supended in a fluid for injection. The fluid may be either aqueous or oily and alternatively the carrier may be first suspended in an aqueous fluid which in turn is suspended as an emulsion in an oily fluid.

The novel injectionable substances of the instant invention are specially suitable for several purpose sof which three are of major importance. Drugs such as extracts of pollen and the like which are the causes of severe adverse reactions if absorbed rapidly can be administered safely. Substances such as bacterial or viral materials or other vaccines which are injected to confer immunity are released slowly into the tissue fluids so that higher antibody titers may be obtained by the use of smaller quantities than would otherwise be required. By suitable choices of the carrier mediums the action of the drug may be delayed so that its onset of action is deferred for long periods of time or until needed. Upon injection the active drug is slowly released to the tissue of the patient as the metabolizable carrier is assimilated by the patient's system. Large amounts of an active drug can be injected at one time without causing adverse affects to the patient.

Prior to the present invention, it was known that an active drug could be suspended in an oily medium or a silicone derivative such as Dow Corning 360 or emulsified in water or other suitable carrier with the active drug constituting the dispersed phase. Upon injection the active drug is diffused slowly into the patient's system, lessening the severe adverse reactions which often occur when an active material is injected directly, even though highly diluted. Although vastly improved results are obtained with these injectionable substances, a number of disadvantages still exist with the use of emulsions making it apparent that the entire problem has not been solved. Thus, in most instances it was not possible to obtain an emulsion which would remain stable outside the body and at the same time retain relative and measurable stability when injected into the body. The first difficulty inherent in the nature of emulsions, is the requirement that the physician prepare the drug in emulsified form each time immediately prior to its administration. At times the emulsifying agent of the medium or the continuous phase themselves cause secondary discomfort if not harmful effects. Furthermore, in emulsion systems, the active drugs exist in the form of droplets no matter how minute. These droplets are often released from the continuous phase rapidly enough to cause reactions in patients particularly sensitive to drugs such as pollens or venoms. These droplets as released from the continuous phase can only remain in the tissues for relatively short periods of time because some are metabolized in part and excreted and therefore only exert their pharmaceutical action in part before such metabolism and excretion takes place. There are drugs which exert their actions while in the process of such metabolism and excretion and others, such as extracts of pollen, extracts of molds and animal danders which are excreted too rapidly for them to invoke much of an antibody effect except as they are transiently within the body. The continuous slow release of such substances from emulsions in part solves the problem of slight activity because of the rapid excretion of the greater amount of such drugs as compared to their injection in unemulsified form, but some of the drug as released from an emulsion is also excreted although in smaller quantities so that what is released invokes a greater antibody effect, although the total quantity injected in one injection of the emulsified drug is less than what is reecived by the patient in injections of emulsified extracts and venoms administered weekly or over a period of years.

More recently in my U.S. Patent No. 3,185,625 issued May 25, 1965, there is described an improved injectionable substance whereby an active drug is deposited upon micro-particles of a metabolizable substance, the micro-particles encapsulated in a suitable material, and thereafter suspending or emulsifying the micro-particles in a suitable liquid for purposes of injection. These injectionable substances have provided greatly improved results for injecting active drugs, particularly where large amounts may have adverse affects on the patient's system, or in instances where prolonged effects of the drugs are necessary. Thus, in essence, upon injection of the materials, the active drug is slowly released to the patient's system upon dissolution of the encapsulating material, and as the metabolizable material is assimilated by the patient's system, the results are highly superior even to those obtained with emulsified drugs whereby the active drugs are still released as droplets of the active substance, no matter how minute.

Although the invention can be employed with any drug, the complete benefit of the invention is derived when employing drugs which may have side effects on the patient, if administered directly. The invention therefore is particularly applicable for the administration of antigens and allergens as in vaccines, anti-allergic drugs, toxins, venoms and the like of which extracts of pollen for the treatment of hay fever patients which may cause severe or fatal reactions in the patient's system if given directly in too large doses is an example. However, as is apparent, the invention can be used to administer relatively non-toxic drugs which it is desired to inject relatively large doses of the material by a single injection to provide protection for relatively long periods of time.

The invention described herein is directed to an improvement in the injectionable substances of my earlier invention. Injectionable substances are now provided which contain increased amounts of active drug per given volume. Moreover, according to the present improvement, an active drug is incorporated in a metabolizable carrier in such amounts and in such a manner so that it is not completely necessary to encapsulate the drug containing carrier, particularly if the carrier and drug are suspended in a non-aqueous medium. As a preferred embodiment, however, the drug and carrier are encapsulated with a thin shell of a suitable material, such as sodium chloride and the encapsulated substance suspended in a non-aqueous medium.

It is an object of the present invention to provide an injectionable instance which is solid, not foreign to the body, and soluble on the basis of a negative feedback that is dissolved by enzyme action but only as required by the body so that the incorporated drug or active ingredient or ingredients will slowly be released into the body fluids of the patient's system.

It is another object of the present invention to provide improved methods of preparing an active substance for administration of injection.

It is another object of the present invention to provide injectionable substances which will slowly diffuse an active ingredient into the patient's system.

It is another object of the invention to provide an injectionable substance comprising micro-particles of a metabolizable material containing large amounts of an active drug.

It is another object of the invention to provide an improved method of incorporating an active drug in a metabolizable carrier comprising lyophilization.

It is another object of the invention to provide an improved extracting fluid from which to prepare certain novel injectionable substances, said extracting fluid being isotonic with the body fluids of a patient.

These and other objects of the present invention will become more fully apparent from the following detailed description.

These objects are realized by the formation of metabolizable crystals or particles in the presence of the injectionable substance or substances with the result that the active substance or substances, when it is advisable for more than one to be injected at one time, are one or both incorporated within the crystal structure and adsorbed on the surface of the crystal. The metabolizable substance which incorporates the drug or drugs is relatively insoluble in water or soluble to so slight an extent that it may safely be suspended in salt water physiological in composition and so injected, or the particles may be suspended in the watery carrier and may be made the disperse phase of an emulsion with an oily fluid, as vegetable oils, mineral oil or suitable silicone derivatives or mixtures of these as the continuous phase or may be suspended in an oily carrier or mixtures of these for injection.

A metabolizable protein substance may be contacted with a suitable fluid containing an active drug, in order to incorporate varying amounts of the active drug into the carrier. One preferred method is to suspend or dissolve the carrier protein in an extract or solution of the active drug and thereafter subject the resultant solution to lyophilization, i.e., to freeze dry under vacuum. Thus, the carrier particles are first frozen to below zero degrees C. and then dried in a vacuum. The water is driven off, and leaves the active drug incorporated within the carrier particles such as amino acids, proteoses, protamines, proteins and mixtures of soluble proteins.

Alternatively, rather than employing the freeze drying technique, the carrier particles can be precipitated from a saturated solution of the fluid to form crystals of the metabolizable substance having the active drug uniformly distributed therein. If necessary, the crystals can be broken up after drying to micro-particle size.

Employing the above procedures it has been found that large quantities of active drug can be incorporated in the carrier particles. Thus, for example, with pollen extracts for treating allergies, more than eighty-five thousand protein nitrogen units of ragweed extract can be incorporated in one gram of glycine or more than 1,000 million typhoid bacteria. Possibly, more of the active material could be incorporated; however, greater amounts are not normally necessary to obtain complete protection.

Upon injection of the carrier particles containing the active drug suspended in a suitable non-aqueous system (an aqueous system may dissolve the carrier and prematurely release the active drug), the active drug is not released to the system in large amounts, as in emulsions of the active drug, but in controlled amounts as the carrier is assimilated by the body fluids of the patient's system. This permits the use of a single injection where in the past several injections were necessary. The metabolizable carrier particle is acted upon by the enzymes of the body fluids, and the incorporated drugs are released slowly as a result thereof.

The release of the active drug or drugs depends on two factors; the removal of the inactive carrier by lippophage cells or its metabolism or by the selection of an oily medium which is phagocytosed slowly. This makes it possible to inject drugs whose action will be deferred for long periods of time.

The invention makes it possible for patients who could not report for treatment with emulsified extracts or vaccines within a period of several months before the onset of the pollen season or before exposure to the disease but who can obtain their injections at an earlier date. The immunizing affects of any present injections if given earlier are decreased by the passage of time so that the patient who receives his injection too long before exposure is not protected. Under certain conditions it is possible for the active drug not to begin to be absorbed into the patient's system until several months after injection. Thus, the injection can be made well in advance of the pollen season or before exposure to any other seasonal or environmental substance to which they are allergic or will be exposed. The deferment of the onset of the activity of the substance incorporated in applicant's composition is not limited in its usefulness to the convenience of the patient or the physician but solves the problem of providing some types of immunizations for patients who are traveling or in military service who may not reach the geographical area in which the protection is needed for some months after the dates on which it is practical or feasible for them to receive the injections. Injections of the requisite types of drugs active, although not necessarily dangerous, may be injected in relatively large amounts at one time without causing adverse or over-loading reactions to the patient. Moreover, prolonged or extended action of the drug for the control of any symptoms of the patient or the development of immunity in the tissues of the patient due to the slow release of the drug may be obtained as the carrier in which the drug is incorporated is assimilated.

This invention represents a distinct improvement over that disclosed in part in my U.S. patent No. 3,185,625 which requires the encapsulation in a thin film of the carrier and the drug before suspension so that solution in watery carriers would not take place and the drug would be protected against the action of light and oxygen or any other agency which might lead to deterioration of the active substance as well as directly to help and insure slow release of the drug as the over-all carrier or medium was absorbed, phagocytosed and assimilated by any means and allow the carrier particles or micro-crystals to be exposed to body fluids at which time the absorbed or adsorbed drug or drugs could be slowly released. The use of micro-particle carriers disclosed herein and the methods of incorporating drugs within these carriers renders the employment of such encapsulating materials optional and in many instances unnecessary. In those instances where it is desired to effect additional delay of the diffusion of the drug or drugs into the system of the patient, the drug as incorporated in the carrier may be encapsulated according to the methods disclosed in my U.S. patent. However, for most purposes encapsulation is not necessary inasmuch as the injectionable substances of the present invention possess many if not all of the same desirable properties as those requiring encapsulation as well as other properties both as referred to and to be described.

Furthermore, although the use of metabolizable carriers such as those employed herein is disclosed in my U.S. patent, that process is not to be confused with the present invention. In the patent the drug is deposited upon or adsorbed on the surface of pre-formed carrier particles among which amino acids may be included. Such systems may require encapsulation to insure protection against deterioration as well as to effect slow diffusion into the body fluids.

According to one aspect of the present invention the metabolizable carrier particles are formed in the presence of the dissolved drug such that it is almost if not entirely incorporated within the crystal or particle structure itself, although some of the drug may be adsorbed in the surface layers of the particles or by ionic attraction remain attached to the surface of the particles. If desirable and depending upon the ultimate purpose of the injection and on the carrier employed, such attached amounts of the drug can in great part be removed. With rare exceptions the amounts of the drug adherent to the crystals would be minute and of relative unimportance. In the few instances in which the adherent portions of the drug might conceivably be important, the crystals or particles comprising masses of crystals could be encapsulated, although the system does not require such encapsulation. Slowness of diffusion of the drug from the metabolizable carrier and protection against rapid absorption and adverse reactions depends on the fact that the metabolizable carrier which is the subject of the present invention is dissolved in body fluids by enzyme action extremely slowly. The natural or levo salt of the metabolizable carrier is only synthesized by the body tissues as required and the presence of any of the carrier in the body acts to prevent further synthesis of the same substance which is not only metabolizable but useful in body chemistry, although not essential to body growth or survival. The metabolizable carrier is in itself not harmful or toxic and in addition serves a small but useful service to the body which must otherwise synthesize it from parent compounds as for example from other amino acids.

The drugs which can be administered according to the instant invention include any active material which may be used to prevent, mitigate or cure disease or maintain health. All such substances are necessarily soluble in water or in body fluids and in liquid or colloidal form may be incorporated in the carrier. Although the invention can be used or employed with any substance needed by the body, as vitamins injected for prophylactic purposes, the most substantial benefit of the invention is derived when employing drugs which necessarily are to be assimilated by the patient's system over a prolonged period of time, for example, drugs which will have a systemic effect upon the patient if administered directly in large dosages. The invention, therefore, is particularly applicable for administering antigens, anti-allergic agents, venoms (as of snakes and stinging animals or stinging or biting insects), vaccines—bacterial or viral—which although beneficial cause adverse effects, toxins, serums or the like including extracts or highly purified fractions thereof as for example, pollens, molds, animal danders and the like as employed in the immunization treatment of hay fever, allergic asthma and other allergic disorders similarly treated, in which the injections as presently constituted may under certain conditions be dangerous, anti-histaminic agents and certain antibiotics. Moreover, the invention can be employed to administer Vitamin C and Vitamin $B_{12}$ which the body cannot store, analgesics, tranquilizers, narcotics, hypnotics, and sedatives both for therapeutic effects, as for the control of pain and the treatment of insomnia, anxiety depression, psychological states, and as well for the treatment of addiction to drugs.

As carriers, any metabolizable protein-like substance may be employed. The term "protein-like" is used to refer to protein, proteoses, protamines and any of the more than eighty amino acids which exist naturally in living organisms as well as those which may be prepared synthetically and possess similar characteristics and properties. The following which are listed as representative of the nine major groups of amino acids are based on the nature of R at the position of the $NH_2$ radical in the structural formula $NH_2$—R—COOH. In the simplest of the amino acids, R is a hydrogen atom, but in all other amino acids R is an organic radical. Alanine, valine, leucine and isoleucine are examples of amino acids in which R is an unsubstituted aliphatic chain. In the amino acids serine and threonine the aliphatic chain bears a hydroxyl group. The amino acids of which aspartic acid and glutamic acid are examples are characterized by R being an aliphatic chain terminating in an acidic carboxyl group. In the groups of amino acids of which arginine and lysine are representative, the aliphatic chain R terminates in a basic amino group. In the amino acid group of which cystine, cysteine and methionine are members, the aliphatic chain referred to contains sulfur. In the amino acids phenylalanine and tyrosine, R is a terminal aromatic ring. In the ninth group of amino acids of which tryptophan, proline and hitidine are members, R is represented by a terminal heterocyclic ring. Other examples of protein-like substances include glycine, norleucine, hydroglutamic acid, hydroxylproline and phenylaline.

The amino acids of which examples have been listed exist in living tissues in conjugated and free forms. The conjugated amino acids which are more common are peptides in which the amino group of one amino acid is linked to the carboxyl group of another. The linking together of various amino acids of this type in chains results in the formation of polypeptides. Some free amino acids are present in living tissues in relatively large amounts as for example, glutamic acid, aspartic acid and their amides, but other free amino acids are present in low concentrations ranging from a fraction of a milligram to several milligrams/100 grams of wet tissue. Each amino acid is ordinarily synthesized at precisely the rate needed for protein synthesis. The regulation of such synthesis is one of feedback control. Each amino acid acts as an inhibitor of its own biosynthesis. If any amino acid is formed in excess of that required for protein synthesis, the biosynthesis of that amino acid is either slowed down or ceases until the excess present in the tissues has been used. Tyrosine has been used as an example because it is not essential for growth. It is obviously not toxic and will not interfere with any body process. The fact that there is a negative feedback control is actually an advantage in that the tyrosine will be utilized by the body as needed and no more will be synthesized while the tyrosine or any other amino acid which serves the same purpose is present in the tissues. It is therefore feasible to modify or to cause further deferment of the action of the incorporated drug by the injection of the crystals of tyrosine in which the drug had not been incorporated.

The amino acids of which examples have been listed may be used alone or in mixtures in accordance with the purpose of the injection. They occur naturally as the levo form except for the dextro form which is present in some plant tissues and in the walls of some micro-organisms. The synthetic amino acids consist of equal mixtures of the D and L forms which are more suitable for the purposes of the present invention and for injection purposes in that they are somewhat less soluble in tissue fluids. The hydrogen, nitrogen, carbon and oxygen can be replaced by isotopes as may any of the constituent atoms of the radicals which are represented by R in the structural formulae. These may be employed interchangeably with the dextro, levo or the DL synthetic forms of the amino acids or any stable mixture of these with proteins, proteoses, protamines, etc., which possess the same or similar characteristics and can conveniently be prepared under sterile conditions and are capable of being assimilated by the tissues of the human or animal bodies. The preferred crystal carriers are glycine and tyrosine.

The over-all carrier or medium in which the carrier and the incorporated drug or drugs are suspended or emulsified include vegetable and nut oils, mineral oils, silicone derivatives of an oily nature, water saline solutions, mixtures of methylcellulose, water, that is saline solutions and benzyl or other alcohols, or mixtures of polyethylene glycol 4,000 and aqueous saline solutions, gelatins or animal or plant origins which also contain amino acids, and gels, sols and agars assimilable by the body as well as coacervates or mixtures of these. The solubility characteristics of the over-all carrier will determine which is to be employed in order to select the carrier which serves best the purpose of the injection. The drugs incorporated in tyrosine may be suspended or emulsified after suspension in water in any of the above mentioned carriers as it is insoluble in those aqueous media in which glycine, because of its solubility, cannot be suspended unless encapsulated in a film which is insoluble in water but amenable to enzyme action.

Where the carrier is in the form of crystals in which the drug has been incorporated, it can be injected directly as a suspension in water as physiological saline or oil or as a suspension in water or preferably physiological saline solution emulsified in the oil. In the latter case the water and the suspended crystals will form the disperse phase and the oil or the oily substance as a silicone derivative will constitute the continuous phase. In order to insure longer lasting stability of such emulsions, emulsifying agents as mannide mono-oleate (Arlacel A) or sorbitan mono-laurate (Tween 20), or sorbitan mono-laurate (Span 20) or mixtures of two or several of these and other emulsifying agents may be employed. Alternatively, the carrier for the crystals in which the drug is incorporated may be suspended in oils, or in oily substances or not suspended in oil but in a carrier substance which is itself an active substance, as a solution of an antihistamine, or a corticosteroid hormone or an antiserum or mixtures of these and similar solutions of drugs to give the patient relief of symptoms or still further to insure the absence of adverse reactions from any incorporated drugs notwithstanding the fact that the same drugs or other drugs which furnish such symptomatic relief or lessen reactions may also be incorporated in the crystal carriers and mixtures of several such crystal carriers incorporating more than one drug or substance may be prepared together, or if prepared separately may be mixed before administration to enhance the one effect or to be the reason for the development of several effects as when vaccines which are not mutually inhibitory are injected at one time. Two pollens which appear in the air in sequence may simultaneously be administered, or the several pollens which are present in the air during the same season, whether related as are the pollens of the grasses or unrelated as are the pollens of the plant, for example, such as plantain and the grasses or trees whose seasons overlap.

Thus, more than one active ingredient may be incorporated in the one type of carrier crystals or the carrier crystals can each incorporate one substance; and several of these may be mixed before injection; and the carrier, when aqueous or in a mixture of saline solution and polyethylene glycol can, as part of the saline solution, carry a dissolved drug for immediate and slightly delayed effects, either as added protection of the patient during the time of release of the drug from the carrier crystals, or to afford symptomatic relief or to treat the patient for one aspect of the disorder while the substance released by the carrier crystals affords relief for another aspect or phase. This latter would hold true for patients who were, for example, allergic to tree pollen but who reported to the physician too late for immunization procedures suitable for tree pollinosis but were also allergic to the pollens of the grasses for which enough time for such immunization existed. The over-all carrier can then consist of a solution of an antihistamine drug and may contain crystals of a corticosteroid drug, and the carrier crystals in which the grass pollen extract has been incorporated in which case there would be immediate relief of symptoms from the antihistamine, delayed relief beginning in 18–24 hours as afforded by the crystals of the corticosteroid of which the amount can be administered in accordance to the duration of relief desired, as from one to eight weeks, while the slow release of the pollen extract from the carrier crystals suspended in the solution immunize the patient against exposure to the grass or other pollens due to be in the air within a period of several weeks or months, as many as two or more after the date of the administration of the injection. An oily carrier may contain crystals of the antihistamine, the corticosteroid hormone and the carrier crystals in which are incorporated the allergens, or drug or drugs previously referred to.

The methods which can be employed to prepare the novel injectionable substances of the present invention are numerous, but some are more to be preferred than others.

One such preferred method is to mix an extract or a solution of the active drug in an almost saturated state with a saturated solution of the carrier amino acid, or a mixture of several amino acids or proteins, and thereafter subject such a mixture to evaporation so that the carrier crystals incorporating the drug are formed. Thus, the carrier particles, if there is water in excess, are first frozen to below 0° C. and then dried in vacuum. The water is thereby removed leaving the active drug incorporated within the carrier particles.

Alternatively, rather than employing the evaporation and freeze drying technique, the carrier crystals as precipitated can be separated by simple filtration and dried in the air or by any number of known methods and then broken up by mechanical means or ultrasonic vibration to micro-particle sizes which may be uniform or of several different diameters in accordance with the purpose for which they are to be injected.

Alternatively, slightly soluble or insoluble amino acids may be placed in alkaline saline aqueous fluids and heated until they go into colloid solution at temperatures lower than those at which destruction occurs. For example, L-tyrosine is soluble only to the extent of 0.196 gram in one liter of water at 0° C. and 0.453 gram/liter at 25° C. and 1.052 grams/liter and at 100° C. to 5.65 grams/liter. It is more soluble at higher temperatures and does not decompose except at temperatures of 342°–344° C. in open systems and at a temperature of 280° C. when rapidly heated in closed systems. The values of D-Tyrosine and DL-Tyrosine are similar for solution and destruction with DL-Tyrosine being the least soluble and being decomposed at a temperature of 316° C. The water soluble antigen, allergen or drug or a vaccine consisting of bacteria or viral particles in suspension can then be added to the colloid solution which is at a temperature which does not destroy or denature the drug, the virus or the bacteria. The mixture is permitted to cool, or the cooling process may be hastened by immersion in a water bath of which the water contains ice. When the amino acid or other protein crystals form, they incorporate the drug or the viral or bacterial particles within their structure. Any water which remains may be evaporated off or removed by freeze drying in a vacuum, that is, by lyophilization.

For the purpose of this specification the term "occluded in situ" is employed to designate the phenomenon whereby the drug is introduced within the crystal or particle structure of the carrier coincidental with the deposition or crystallization of the same or is both introduced in this manner within the particles structure or is absorbed by its superficial layers or adsorbed by it or adherent because of ionic attraction, although it can be demonstrated by X-ray diffraction patterns and other methods that the greater part of the drug is incorporated within the structure of the crystals of the amino acid, amino acids or the mixtures previously referred to.

It may be desirable to encapsulate the micro-particles incorporating the active drug to achieve an even higher degree of protection of the patient. The substances employed to encapsulate the micro-paricles incorporating the active drug or drugs include common encapsulating materials such as the celluloses, especially cellulose acetate, butyrate, methylcellulose and polymers and the like. It is, of course, necessary that the escapsulating substances employed is capable of assimilation by the tissues of the patient without being the cause of any harmful effects. Low molecular weight polymers of polyethylene, polypropylene, methylmethacrylate, methacrylate, methylcellulose, hydroxyethylcellulose, ethylcellulose, soft gelatin as plasticized with a polyol as glycerin or sorbital or hardened gelatin as prepared by exposure of the gelatin to a number of substances, for example, to formaldehyde, vegetable gums, phenyl salicylate, cetostearyl alcohol and the like and silicone derivatives are suitable for such encapsulation, since they are capable of being deposited as extremely thin continuous films. However, sodium chloride, i.e., common table salt although of chemical grades and free of substances added to promote free flow, as for example, sodium silico-aluminate, tricalcium phosphate and polysorbate 80 and the like has been discovered to be particularly desirable, primarily because of ease of application and the ability of the human body to assimilate the protective covering of the micro-particles without harmful effects.

Thus, as a preferred embodiment, the particles are placed in a container within a sealed chamber from which the air has been exhausted so that there is a partial vacuum. The container is constructed so that it can be vibrated or shaked from outside the container so that particles can be separated from each other by mechanical means. The required amount of sodium chloride has previously been placed in a cup attached to the inside wall of the container with the amount depending to the thickness of the coating of the particles desired. In the cup which contains the sodium chloride there are two wires arranged so that there is a gap across which an electric spark or current can be forced to jump. The formation of the spark causes a temperature of more than 800° C. at which the sodium chloride is converted from the solid to a gaseous state. The particles are vibrated or shaken until all are uniformly coated with the sublimed sodium chloride which returns to its solid state when it comes into contact with the micro-particles which are held at a temperature low enough to preserve them and the incorporated drug against deterioration. The sodium chloride rapidly drops in temperature to about 40° C. upon contact with the micro-particles. The thickness of the coating depends not only on the amount of sodium chloride sublimed, but also, within limits, on the length of time the particles are exposed to the sublimed sodium chloride, the process ceasing when all of the sublimed sodium chloride has returned to its solid state. The thickness of the coating determines to a small extent the length of time needed for the micro-particles to be exposed to the body fluids in which sodium chloride is readily soluble. Calcium chloride and potassium chloride may similarly be employed, since they sublimate at temperatures close to that of the sodium chloride. Mixtures of the three salts and others may also be used.

Thus, neither the carrier substance nor the incorporated therapeutic agent is altered by exposure to the sublimated salts and they are not affected by the confined heat of the sublimation process or the temperature of the sublimed salts. The coating or encapsulation is usually no more than 0.05 micron in thickness but can be made as thick as 60 microns or more, if required. The lower range of thickness is governed only by the need for a continuous coating or film, and the upper range being governed by the requirement that the injectionable substance be capable of passing through the bore of the hypodermic needle chosen for the injection. The finer needles possess an internal diameter equal to 200 microns, with those used in practice varying from a 27 gauge with an internal diameter of 0.25 mm. and the courser needles having openings above about 0.84 mm. with the largest an 11 gauge with an internal diameter of 2.45 mm. As is apparent, it may be desirable to coat the micro-particles which may incorporate one or several drugs or micro-particles, each of which incorporate different drugs with different types and thicknesses of coatings, and thereafter to suspend an admixture of such particles in a suspending fluid for injection. In this manner, one active drug will be released and exposed to the body fluids before another, thus providing a convenient means for successively causing antibody formation or therapeutic effects without adverse, untoward, toxic or systemic reactions. Also, micro-particles incorporating the one therapeutic or immunizing agent may be coated with different types of shells or shells of different or varying thicknesses which would dissolve at predetermined rates, thereby prolonging the immunization time or the duration of therapeutic effects of the injected drug.

When coating materials other than sodium chloride or salts sublimating with the same range of temperature are employed, coating methods commonly known in the art may be used. Thus, one method is to suspend the discrete particles of the desired size or sizes in a moving column of air and spraying the liquid encapsulating material onto the micro-particles. The particles being suspended in the moving column of air and by being agitated so that they are in constant motion, will not unduly conglomerate and will be evenly coated with the encapsulating material. Another method is to spray the discrete particles with a suitable adhesive material and thereafter coat the micro-particles with a finely divided dry powder by means of a moving fluid bed. Suitable methods and apparatus for use in the present invention are disclosed in U.S. Patents Nos. 2,986,475; 2,768,093 and 2,799,241.

As indicated previously, encapsulation may be used to insure protection against oxidation and other forms of deterioration but is unnecessary to afford protection against the rapid solution of the microparticles in the body fluids of the patient. Various types of encapsulation may be employed to vary the rate of such assimilation. The relative insolubility of the carrier particles in the body fluids and the necessity for their assimilation by enzyme action permits the drug or drugs incorporated to be released slowly thereby affording ample protection.

Suitable substances useful as a suspending medium for the protein carrier particles containing the active drug, whether encapsulated or not, include mineral oil, silicone oil, vegetable oil such as those derived from corn, sesame oil, peanut oil as well as the liquid polyethylene glycols. It is important that the suspending medium be non-toxic to the patient's system in small amounts.

Having described the invention in general terms, a more detailed description of the invention will be given in reference to the preferred embodiments. However, the invention is not to be construed as being limited thereto.

EXAMPLE 1

One gram of DL-Tyrosine was placed in 20 ml. of distilled water of which the pH was adjusted to 0.5 to 1.0 with 1.0 N HCl and the mixture heated to 72° C. until all of the DL-Tyrosine had dissolved going into its colloidal state.

An aqueous suspension of typhoid and paratyphoid A and B micro-organisms (prepared by the Department of Public Health, Division of Laboratories of the Commonwealth of Massachusetts) was prepared in the following manner: $8\times10^9$ typhoid bacteria and $750\times10^6$ each of paratyphoid A and B bacteria was suspended in 20 ml. of water and 2.5 ml. of a solution of colloidal fluorescein isothiocyanate was added. The mixture was kept at 5° C. overnight. This process tags the micro-organisms with the fluorescent dye so that they are visible after incorporation in the amino acid crystals. The suspension of tagged micro-organisms is then placed into a Visking Sausage Casing and dialyzed against an 0.85 percent sodium chloride solution until no more fluorescein isothiocyanate is visible in the dialysate.

Of this suspension of tagged micro-organisms, 2.5 ml. or more is placed in the DL-Tyrosine solution which has been permitted to cool to room temperature. The suspension and the solution are thoroughly mixed. The mixture is cooled rapidly in an ice bath, and as the temperature falls crystals of DL-Tyrosine are formed having incorporated with the fluorescein stained bacteria. The mixture which contains the precipitated crystals is then placed into a cryostat and freeze dried. The dry precipitate is crushed by mortar and pestle or ultrasonic vibration to any desired particle size usually small enough to pass through the hypodermic syringe needle chosen for the injection. The particles can be screened aseptically so that ranges of sizes of particles may be obtained. Examination of the particles microscopically by ultraviolet light demonstrates the presence of the bacteria within the crystals of the amino acid.

EXAMPLE 2

The stability of the crystals incorporating the bacteria or drugs can be demonstrated by a number of methods. The crystals are prepared in the same manner as in Example 1 and may either be tagged with the fluorescent dye or not tagged.

(A) One gram of the crystals is placed in an excess of distilled water which is kept at room temperature and continuously stirred for 24 hours. Only a minute amount of the amino acid goes into solution.

(B) The stout needles of DL-Tyrosine are soluble in water to the extent of 0.351 gram/liter at 25° C. Of the precipitated crystals in which the bacteria were incorporated, 0.351 gram were placed in 100 ml. of water kept at a temperature of 64° C. for 48 hours with negligible solubility. The tagged micro-organisms retain their dye.

(C) One gram of the crystals incorporating the micro-organisms was placed in 500 ml. of distilled water and kept in a water bath maintained at a temperature of 78° C. for 48 hours with negligible solubility.

(D) The enzymes trypsin, papain and pepsin were added individually as two percent solutions to the samples of the carrier crystals as prepared suspended in water. The micro-particles retained their integrity and there was negligible solubility after some days of such exposure.

(E) All of the enzymes listed in (D) were added in the same strengths but simultaneously, and the mixture was incubated both at 37° C. for five days and at 64° C. for 48 hours with no effect.

(F) Into 5 ml. of human plasma, 0.2 g. of the substance was placed and incubated for five days without the addition of the enzymes listed; for the next succeeding five days the plasma and the crystals were incubated after the addition of a five percent solution of pepsin; and for the next five days was similarly incubated after the addition of five percent solutions of trypsin, papain and amylase. There were no detectable signs of solubility.

EXAMPLE 3

This example compares the antibody titers of the blood of animals injected directly with subcutaneously placed aqueous suspension of the typhoid and paratyphoid cells previously referred to and animals similarly injected with the novel substance, a suspension of the micro-particles of the present invention in which the bacteria have been incorporated.

Rabbits of both sexes, nine months of age and weighing between five and six pounds were used in the study.

(A) Three of the rabbits were injected with 0.5 ml. of a suspension of the micro-organisms. The number consisted of $5\times10^8$ typhoid bacteria and $125\times10^6$ each of the paratyphoid A and B bacteria. Fourteen days later the animals received injections of identical quantities of the same vaccine.

The serum of the blood taken from the inoculated animals on the fifteenth post-injection day demonstrated an antibody titer of 1:20 to be present. By the twenty-fifth day the titer had decreased to 1:10 and by the thirty-second day there were no applicable titers.

(B) There were no titers in the three control animals which had received no injections and which had been kept under identical conditions.

(C) The substance of the present invention was prepared in accordance with Example 1 except that no fluorescent dye was added. The micro-particles were suspended in saline. Rabbits similar in all characteristics to those used for the preceding experiments were used. Each received 0.5 ml. of the suspension in which was contained $5\times10^8$ typhoid bacilli and $125\times10^6$ paratyphoid A and B bacteria. The antibody titers of the animals' blood gradually rose to reach a level of 1:320 and 1:640 by the fifty-seventh post-injection day.

(D) It was concluded that less of the typhoid vaccine incorporated in the micro-particles would be as effective, and three more rabbits identical in all respects to those previously used received injections of the suspension of the micro-particles incorporating the typhoid vaccine, except that the number of bacteria had been decreased to $150\times10^6$ typhoid bacteria and $37.5\times10^6$ paratyphoid A and B bacteria. By the fifty-seventh day the serum antibody titers were 1:320, thereby demonstrating that smaller quantities of the typhoid and paratyphoid bacteria as released slowly from the micro-particles of the DL-Tyrosine in which they had been incorporated led to a higher antibody titer which developed over a longer period of time.

(E) The novel injectionable substance was suspended in water and the suspension was emulsified in a mixture in which Isocreme was used as an emulsifying agent and Dow Corning silicone 550 as the continuous phase. Of the resultant emulsion, 0.5 ml. contained $150 \times 10^6$ typhoid cells and $37.5 \times 10^6$ each of paratyphoid A and B cells. Three rabbits received subcutaneous injections of the emulsion referred to, each injection consisting of approximately one-third of the number of bacteria received by the rabbits in Example 3(A). A second injection was administered eleven days later. It consisted of 0.5 ml. of a newly prepared emulsion so that the injection consisted of $60 \times 10^6$ typhoid cells and $15 \times 10^6$ each of the paratyphoid A and micro-organisms. The quantities of the vaccine injected is substantially less than those of Example 3(A).

By the eighteenth day after the first injection, the serum of the blood of the three rabbits demonstrated an antibody titer of 1:80; by the thirtieth day the titer was 1:160; and by the fortieth day after titer attained a level of 1:320 where it leveled off.

Thus, it can be seen that when a substance of which the quantities injected and resultant antibody effect may easily be measured with precision is incorporated in the micro-particles less of the vaccine as administered according to the method of the present invention as compared with the direct subcutaneous injection of larger quantities of the unincorporated vaccine leads to the development of higher antibody titers which are maintained for longer periods of time.

(F) Similar quantities of the micro-particles incorporating the same vaccine, namely $150 \times 10^6$ typhoid bacteria and $37.5 \times 10^6$ paratyphoid bacteria A and B were suspended in mineral oil, Drakeol 6 VR (Pennsylvania Refining Company) were injected in rabbits of similar characteristics as those used for the other studies described. By the fifty-seventh day there were the first signs of antibody development demonstrating that the micro-particles could be used to initiate immune responses which could be delayed in onset as depending on the medium in which they were suspended.

EXAMPLE 4

An injectionable substance containing an allergen was prepared as follows:

(A) An extracting fluid was prepared which would, in almost all respects be the equivalent of serum as regards its isotonicity. When injected subcutaneously or intramuscularly, it would not act as though it were arterial and draw fluid from the tissues or capillaries or be venous in type and be adsorbed with great rapidity, nor would some constituents act as though they were arterial and others as though they were venous as is the case with presently employed so-called isotonic saline solutions which are isotonic only as regards some of the contained salts, other being absent. The extracting fluid consists of an admixture of the following:

$CaCl_2 \cdot 2H_2O$: 0.367 g. ($CaCl_2$=0.277 g.)
$MgCl_2 \cdot 6H_2O$: 0.301 g. ($MgCl_2$=0.137 g.)
NCl: 0.373 g.
Glycine: 1.201 g.
$Na_2SO_4$: 0.071 g.
HCl 0.5 N: 180 ml. (HCl=3.282 g.)
$NaHCO_3$: 2.270 g.
NaHPO: 0.142 g.
Lactic acid 85%: 0.636 mg. (Lactic acid=0.541 mg.)
NaOH 0.5 N: 224 ml. (NaOH=4.48 g.)
Distilled water to one liter.

The fluid which possesses a pH of approximately 7.0 is substantially isotonic with blood plasma and similar in composition except for the absence of glucose enzymes, hormones and other constituents of the plasma which do not affect its isotonicity. The osmotic pressure of the blood as partly due to the present of albumin and globulin is compensated for by some of the ingredients of the mixture. It is realized that the hydrochloric acid and the sodium hydroxide are incompatible, but they are not added at the same time and are needed for the final adjustment of the pH.

(B) Of the following pollens which have been defatted with ether and dehydrated to remove water, four grams are added; Sweet Vernal grass (*Anthoxanthum odoratum*), June grass (*Poa pratensis*), Orchard grass (*Dactylis glomerata*), Meadow Fesque grass (*Festuca elatior*) and five grams of Timothy grass (*Phleum Pratense*) to 200 ml. of the extracting fluid described in (A) above and extracted for 48 hours at 4° C. with constant stirring or agitation. When the extraction has been completed, the residue which consists of pollen grains free of the allergenic material is removed from the extracting medium by filtration through a Whatman No. 1 filter paper using a glass funnel. The filtrate is then refiltered into a sterile 500 ml. bottle through a sterile No. 6 Seitz Laboratory filter pad.

(C) Ten grams of glycine is then dissolved in the filtrate of (B) and the resultant filtrate is freeze dried, that is, lyophilized at a temperature below 0° C. in a vacuum maintained at a pressure of 3 mm. of water. When all of the water has been removed, what remains are micro-particles of glycine containing the protein fractions of the extracted pollen and the ions of the extracting fluids uniformly incorporated therein. A small amount of the allergen may be absorbed and some may be adsorbed on the surface of the crystals of micro-particles. The process of solution to the point of almost complete saturation, and the addition of the extract, and the precipitation of the crystals and the lyophilization may be repeated so that greater amounts of the active drug can be incorporated in the micro-particles.

(D) One half of the quantity of the micro-particles prepared as in (C) above are placed in a vacuum chamber in the cold, and while being agitated by vibration are exposed to gaseous or sublimed sodium chloride or mixtures of salts which are non-toxic and which sublime in the same manner within the same ranges of temperatures. Upon and during deposition on the micro-particles, the temperature of the gaseous sodium chloride or other salts or mixtures of these with sodium chloride drops immediately to below 40° C. thereby causing no deterioration of the organic ingredients of the micro-particles or conglomerations of the crystals or the glycine itself.

The remainder of the micro-particles as prepared in (C) above are suspended in Drakeol 6VR, a non-aqueous mineral oil. A second injectionable fluid is prepared by suspending in Drakeol 6VR the micro-particles as encapsulated, that is, prepared as in (D) above.

Whether encapsulated or not, the micro-particles when injected into a patient in a non-aqueous medium as mineral oil or a silicone as Dow Corning 360 are exposed a few at any one time during a long period to the enzymes normally present in the fluids of the tissues. The sodium chloride encapsulation dissolves quite rapidly, the time of solution depending on the thickness of the coating. The enzyme action at the molecular level releases the molecules of the active allergen and simultaneously the anions and cations of the extracting fluid which also act to slow the rate of absorption of the allergen. As is apparent, the amount of active drug is released in a given period of time and can be accurately controlled. Radioactive isotopes have been utilized in the hydrocarbons of the mineral oil to determine its rate of metabolism and excretion in the urine of dogs and the mammary glands of pregnant guinea pigs in whose milk they appear and can be measured. Radio-actively tagged substances have been embodied in the allergens and the micro-particles to measure the time they remain at the site of injection and to follow their storage in the elements of the recticuloendothelial system, various organs and their excretion from the body.

Thus, the amount of the active drug released depends on the quantity which is contained in the amino acid particles, the size of the particles as predetermined by screening for the desired size and the nature and thickness of the coating applied. It is possible to use unscreened particles of the glycine and the allergen or glycine and other drugs as antihistamines all of one size but containing different amounts of the active drug or microparticles of different sizes. It is possible to vary the amount of the suspended particles and to add other microparticles otherwise prepared for concurrent effects. It is possible to vary the coatings of the particles used and these may be mixed in the one suspension. It is possible to vary the medium in which the micro-particles are suspended so that the micro-particles may be exposed at different times and different rates depending on the purpose of the injection.

In the above example, alternatively to proceeding as in (C), a sufficient amount of glycine may be added to the extracting fluid and the allergen of (B) to obtain a saturated or super-saturated solution in order that glycine crystals will precipitate from the mixture. The precipitated glycine crystals will contain the extract of the pollen or the drug to be used and the ions of the extracting fluid or the same fluid as used to dissolve the drug uniformly incorporated therein. Upon drying, the crystals can be suspended directly in a suitable oily medium or can be encapsulated as in (D) for suspension in an aqueous medium prior to emulsification.

As employed herein, "dissolving" and "solution" includes colloidal dispersion and mixtures of solutions as when the substance is slightly soluble and colloid dispersions as well as true solutions.

While the preferred embodiment is directed to the preparation of allergenic injectionable materials, the invention can be employed to incorporate any active drug which may cause systemic reactions in the patient or where it is desirable to have the drug slowly released to the patient's system to prolong its effectiveness. Thus, the illustrative embodiment is set forth for demonstrative purposes and is not intended to limit the invention. It is possible to produce still other embodiments without departing from the inventive concept herein disclosed.

I claim:

1. A therapeutic composition for injection, comprising finely divided crystalline lattice micro-particles of a protein, protease, protamine or amino acid as a metabolizable substance having an active fluorescent-dye tagged or untagged drug, bacterial micro-organism, or allergen physically incorporated into the internal structure of said micro-particles, said micro-particles being further encapsulated in sodium chloride as a metabolizable film-forming substance said micro-particles being suspended in a physically acceptable or non-toxic oil or aqueous carrier.

2. The composition of claim 1 wherein said metabolizable substance is a D, L or DL amino acid.

3. The composition of claim 2 wherein said metabolizable substance is tyrosine.

4. The composition of claim 1 wherein the carrier is an oil.

5. The composition of claim 1 wherein the carrier is aqueous.

6. The composition of claim 2 wherein the suspension of microparticles in an oil carrier is suspended or emulsified in an aqueous medium.

7. A method of preparing an injectionable substance as in claim 1 which comprises the steps of dissolving said active drug to be injected and said metabolizable substance in a liquid solvent therefor, causing said dissolved metabolizable substance to deposit out of solution in said liquid whereby said active drug is occluded in situ within the internal structure of the deposited substance; drying said metabolizable substance with the active drug occluded therein and reducing the same to particles of micro size; encapsulating said micro-particles in sodium chloride and suspending said salt coated microparticles in a physiologically acceptable carrier medium for injection.

8. The method of claim 7 whereby the metabolizable substance is deposited from said fluid by lyophilization.

9. The method of claim 7 whereby the metabolizable substance is deposited from said fluid by precipitation from a saturated solution of said metabolizable substance in said fluid.

10. The method of claim 7 wherein the carrier is an oil.

11. The method of claim 7 wherein the carrier is aqueous.

12. The method of claim 11 wherein the suspension of micro-particles in an oil carrier is emulsified in an aqueous medium.

13. The therapeutic composition of claim 1 wherein said microparticles are crystalline in structure, and said active drug is fluorescent dye-tagged and is occluded in situ within the crystalline lattice of said particles.

14. The method of claim 7 wherein said active drug is an allergen and is prepared by extracting a substance containing said allergen with an extracting fluid consisting essentially of the following constituents in the following amounts:

|  | Grams |
| --- | --- |
| $CaCl_2$ | .277 |
| $MgCl_2$ | .137 |
| KCl | .373 |
| Glycine | 1.201 |
| $NaSO_4$ | .071 |
| HCl | 3.282 |
| $NaHCO_3$ | 2,270 |
| $Na_2HOP_4$ | .142 |
| Lactic acid | .541 |
| NaOH | 4.48 |

Distilled water QS to 1000 cc.

Said extracting fluid having the allergen dissolved therein being then used to dissolve said metabolizable substance.

15. The method of preparing injectionable substances as in claim 1 which comprises the steps of dissolving said crystallizable, metabolizable proteinacous substance and said active drug to be encapsulated in a solvent therefor, causing said proteinacous substance to crystallize from said solution thereby occluding said drug in situ within the crystalline lattice as a finely divided particle, encapsulating said finely divided particles in sodium chloride, and suspending said salt coated crystallized substance as finely divided particles within a physiologically acceptable oil or aqueous carrier medium for injection.

16. The method of modifying the absorption by a living body of an active drug which comprises the steps of injecting into said body sodium chloride-coated particles of an amino acid naturally biosynthesized and assimilated by said body, said particles having said active drug distributed through the interior thereof, and injecting into said body additional particles of said amino acid free of said active drug, whereby said drug-free particles compete with said drug-containing particles for assimilation by said body.

17. As a composition of matter, a non-aqueous suspension of finely divided microparticles as in claim 1 of said metabolizable carrier having said active drug incorporated therein and encapsulated in a thin continuous shell of sodium chloride.

18. The composition of claim 17 wherein the microparticles have a size of from about 1.5 to about 200 microns.

19. The composition of claim 17 wherein said non-aqueous suspension is an oil suspension.

20. The composition of claim 19 wherein the oil is mineral oil.

21. The composition of claim 18 wherein the active drug is an allergenic material.

22. The components of claim 17 wherein said metabolizable carrier is a proteinacous substance.

23. The composition of claim 17 wherein said salt shell is condensed on the surface of said microparticles.

24. The composition of claim 17 wherein said salt shell has a thickness of about 0.05–60 microns.

25. The method of encapsulating finely divided microparticles as in claim 1 of said metabolizable carrier having an active drug incorporated therein, which comprises the steps of vaporizing sodium chloride and condensing said salt vapor upon the surface of said particles to form thin continuous shells of said salt encapsulating said particles.

26. The method of claim 25 wherein said salt is vaporized by sublimation.

References Cited

UNITED STATES PATENTS

| | | | |
|---|---|---|---|
| 2,149,304 | 3/1939 | Masucci | 424—88 |
| 2,445,300 | 7/1948 | Chambers et al. | 424—88 |
| 2,644,782 | 7/1953 | Harned et al. | 424—227 |
| 2,846,057 | 8/1958 | Polin | 206—.5 |
| 3,096,249 | 7/1963 | Prigal | 424—88 |
| 3,185,625 | 5/1965 | Brown | 424—91 |
| 3,240,670 | 3/1966 | Feinberg | 424—184 |
| 3,244,172 | 4/1966 | Brown | 128—218 |

OTHER REFERENCES

Chem. Abstracts 54: 17758d (1960).

Brown (XVIII) Rev. Allergy 16: 171, 176–177, March–April, 1662.

SHEP K. ROSE, Primary Examiner

U.S. Cl. X.R.

424—2, 8, 9, 12, 16, 19, 88, 89, 91, 92, 98, 115, 177, 201, 240, 280, 319, 359